July 17, 1962

K. GEBELE 3,044,376

PHOTOGRAPHIC CAMERA

Filed March 31, 1959

July 17, 1962 K. GEBELE 3,044,376
PHOTOGRAPHIC CAMERA
Filed March 31, 1959 3 Sheets-Sheet 3

United States Patent Office 3,044,376
Patented July 17, 1962

3,044,376
PHOTOGRAPHIC CAMERA
Kurt Gebele, Munich, Germany, assignor to Compur-Werk Friedrich Deckel oHG, Munich, Germany, a firm of Germany
Filed Mar. 31, 1959, Ser. No. 803,204
Claims priority, application Germany Apr. 3, 1958
13 Claims. (Cl. 95—10)

The present invention relates to a photographic camera for the automatic setting of exposure values and, more particularly, to such a camera of the type having a built-in exposure value meter having an indicating pointer, a shutter speed setting member, and a diaphragm aperture setting member, in connection with which for the setting of exposure values, one of the setting members is freely movable to a preselected value, while the other setting member is set to a limit position at one end of its range and upon its return from this limit position can be locked by a stop member in a position dependent on the position of the freely movable setting member and the exposure value indication. More specifically, the position of the stop member determines the point at which the other setting member is stopped, and the position of the stop member depends on the preselected setting of the freely movable setting member and on the sensed position of the meter pointer.

An object of the invention is the provision of a new and improved camera of the foregoing type in which the other setting member is returned from its limit position under the action of a strong restoring force into a stop position, while yet not producing any reaction or only an insignificant reaction on the sensitive parts of the exposure value meter, particularly its pointer.

Another object is to provide an improved camera for the setting of exposure values in which one of the two factors of shutter speed and diaphragm aperture is preselected and the other factor is automatically set in accordance with the preselected factor and an exposure value indication, so that the adjustment of the camera is possible with a minimum of thought and with only a few setting movements.

Yet another object is the provision of a camera in which the shutter speed is preselected and manually set, while the diaphragm aperture is set automatically, but wherein the diaphragm aperture may be optionally set to a desired value independent of the shutter speed setting.

A further object is to provide an improved camera having mechanism for automatically setting exposure values constructed and arranged to be operatively connected with the winding device for tensioning the shutter and advancing the film and to be released by operation of the shutter release, whereby the camera is adjusted and operated with a minimum of thought and effort.

A still further object is the provision in a camera having an objective shutter and a lens mount axially adjustable for distance focusing, of a coupling between a diaphragm setting ring and the lens mount for automatically focusing the lens mount upon setting a particular diaphragm aperture.

These and other desirable objects may be attained in the manner disclosed as an illustrative embodiment of the invention in the following description and in the accompanying drawings forming a part hereof, in which:

FIG. 4 is a fragmentary radial cross-section of a portion of the objective unit shown in FIG. 1 illustrating a coupling between a pair of setting rings;

FIG. 5 is a fragmentary face view partly in cross-section of the coupling and rings of FIG. 1 looking outwardly from within the unit;

The same reference numerals throughout the several views indicate the same parts.

Figure 1:
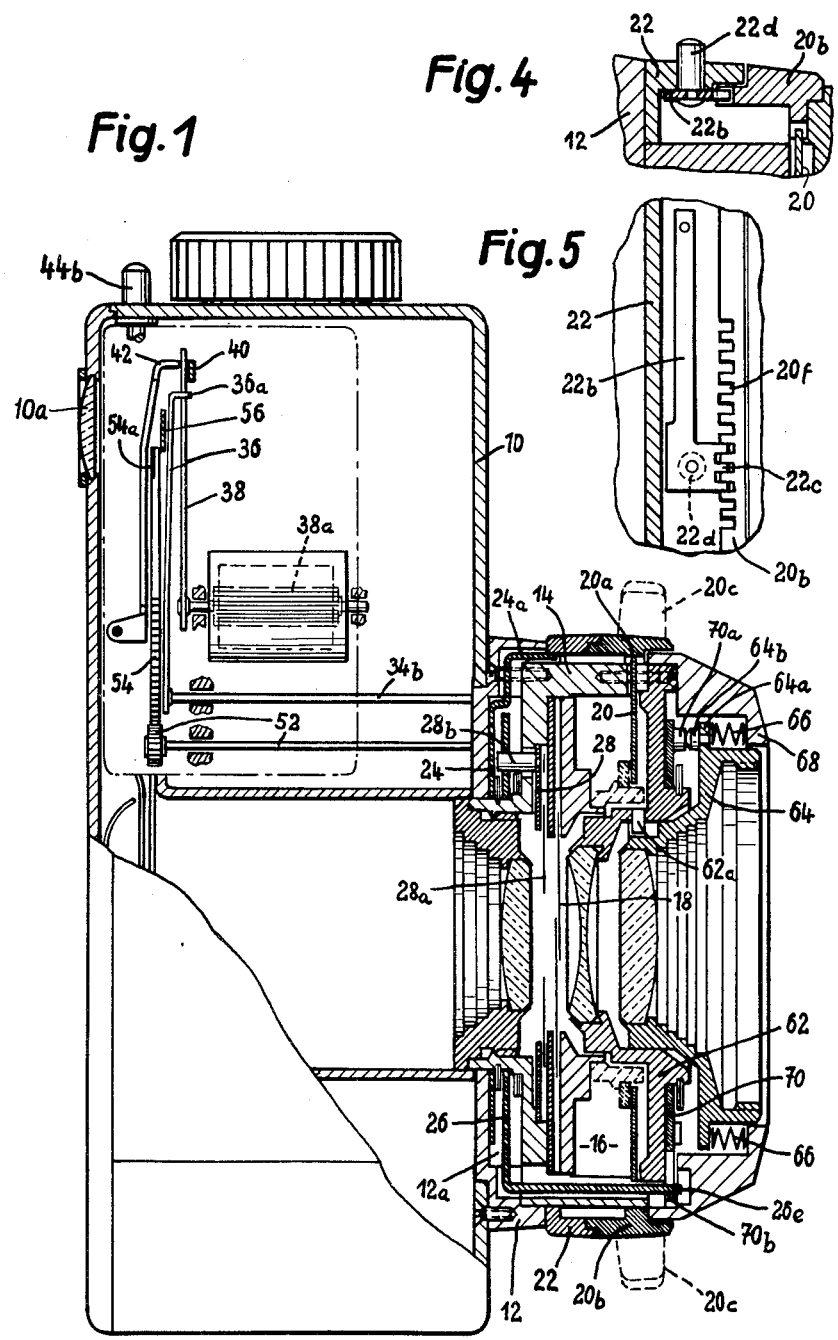
FIG. 1 is a side elevational view partly in cross-section of a camera body to which is attached an objective unit, shown in radial cross-section, the camera body and objective unit being equipped with a setting arrangement according to the invention, and the objective unit being also provided with an automatically adjustable lens mount.

In FIG. 1 is shown a photographic camera commonly known as a miniature camera and of the type having an objective shutter and an exposure value meter. On the front of the camera body 10 there is fastened a mount 12 on which, in turn, is secured a housing 14 of an objective shutter. The shutter housing is of the usual annular shape surrounding the optical axis of the objective, the internal mechanism of the shutter being of any suitable type and contained within the annular space 16. The shutter includes a plurality of shutter blades 18 driven by a main drive member or master member, not here shown, which opens and closes the blades for the exposure upon running down from its tensioned or cocked position to its rest position. Although any suitable type of objective shutter may be employed, the shutter conveniently is of the kind disclosed in British Patent 769,086, to Deckel, published Feb. 27, 1957, and in the corresponding United States application, Serial No. 509,929, filed May 20, 1955 (now Patent 2,943,551, granted July 5, 1960), in the name of the present applicant, certain details of the shutter and of suitable mechanism within the camera body for operating the shutter being disclosed also in the copending United States patent application of K. Gebele, Serial No. 520,875, filed July 8, 1955 (now Patent 2,900,-886, granted August 25, 1959). These details are not of importance to the present invention, except insofar as disclosed in the present application.

On the front of the shutter housing 14, an internal shutter speed control ring 20 is mounted rotatably in any suitable manner and is provided with the customary cams for controlling the shutter speed, e.g., like the cams on the speed control ring 63 of Deckel and Geiger Patent 1,687,123. The ring 20 has a radially extending arm 20a in driving engagement with an external shutter speed setting ring 20b rotatably supported on the periphery of the shutter housing. To facilitate the manual rotation of the ring 20b to adjust the shutter speed, the periphery of the setting ring 20b is provided with suitable grips such as the handles 20c. The periphery of the ring 20b is also provided with a shutter speed scale 20d, see FIG. 2, which is settable in conjunction with a stationary mark carried by the shutter housing. Rearwardly of the setting ring 20b, likewise mounted rotatably on the periphery of the shutter housing, is another ring 22 suitably coupled with the ring 20b for the setting of film speeds. A circumferentially graduated film speed scale 22a is carried by the ring 22 and cooperates with a mark 20e on the shutter speed setting ring 20b.

As is apparent, the film speed setting ring 22 may be brought into different relative positions with respect to the shutter speed setting ring 20b. Conveniently, the two rings are provided with a detachable coupling for coupling them together in the relative position set. This detachable coupling may take the form shown in FIGS.

4 and 5, wherein a leaf coupling spring 22b is anchored at one end in the ring 22 and has axially extending coupling claws 22c at its other end which engage in correspondingly shaped axially directed notches 20f in the setting ring 20b. The coupling claws 22c are displaceable radially inwardly out of engagement with the notches 20f by means of a radially extending button 22d which extends through the ring 22 and is accessible from the exterior of the shutter. It can be readily seen that digital pressure on the button 22d disengages the claws 22c from the notches 20f, whereafter the ring 22 may be moved relative to the ring 20b to set the appropriate film speed and they may again be detachably coupled together.

Figure 2:
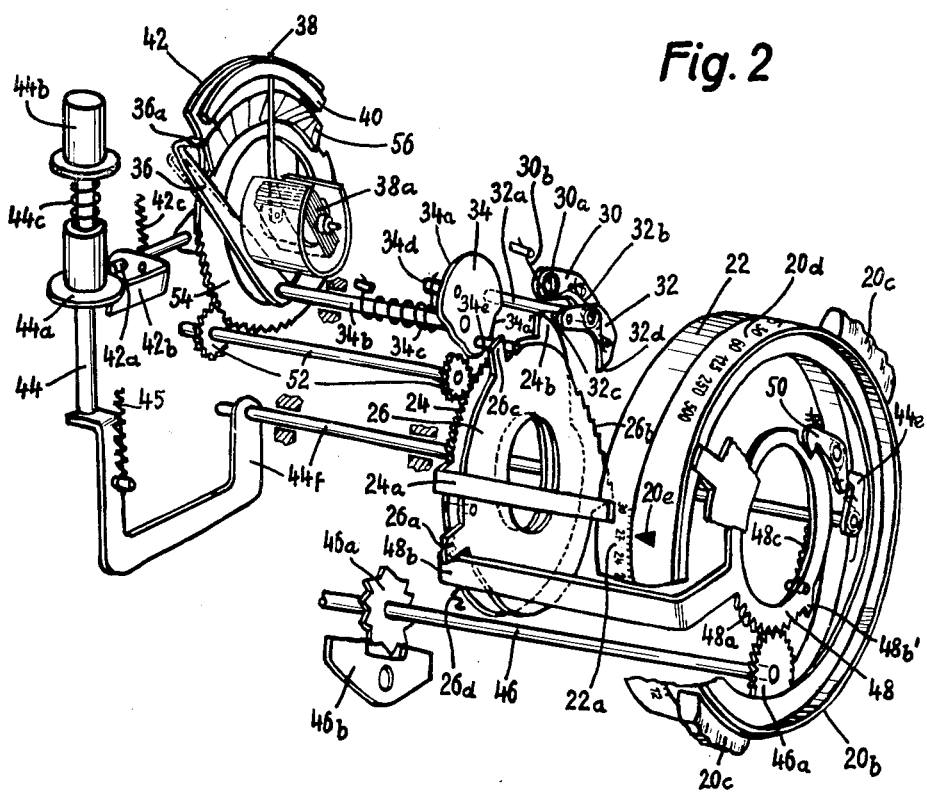
FIG. 2 is an exploded perspective view of the setting arrangement according to a first embodiment of the invention, seen obliquely from the front.

In an annular space 12a between the mount 12 and the rear end of the shutter housing 14, a first control ring 24 and a second control ring 26 are mounted for rotational adjustment about the optical axis. The control ring 24, referring to FIG. 2, is partially toothed on its periphery and has a radial arm 24a with its free end bent forwardly and in engagement in a slot of the ring 22 in order to couple the two rings for joint rotation. Thus, joint rotation of the shutter speed setting ring 20b and the detachably coupled ring 22 likewise adjust the control ring 24. Furthermore, the control ring 24 is provided on a portion of its periphery with a radially rising smooth cam surface 24b.

The other control ring 26 is connected for rotation with a diaphragm adjusting ring 28 mounted within the objective shutter 14 and which adjusts the aperture of the iris diaphragm leaves 28a in the usual manner to the particular diaphragm aperture desired. The coupling between the rings 26 and 28, better seen in FIG. 1, suitably takes the form of an axially extending pin 28b fixed to the ring 28 and engaging snugly in an opening in the ring 26. The control ring 26 also bears on its periphery a cam surface 26b which rises radially in a stepwise manner. It is to be noted, however, that the two cam surfaces 24b and 26b rise in opposite directions.

As will be more apparent from the discussion to follow, the control ring 26 is arranged to be moved to a limit position corresponding to a maximum diaphragm aperture simultaneously with the cocking of the shutter. Subsequently, but before the opening and closing of the shutter blades 18 to make the exposure, the control ring 26 is released and urged toward a position of minimum diaphragm aperture under the actuation of a spring 26d. The return movement of the control ring 26 is stopped at a position corresponding to the appropriate diaphragm aperture by means of a stop arranged to engage the appropriate one of the steps on the cam surface 26b. The appropriate diaphragm aperture, since this is a camera which sets exposure values in the preferred embodiment, depends on the shutter speed set on the camera and the indicated exposure value for the instant illumination conditions. A differential rocker arrangement provides the stop for cooperating with the various steps on the cam surface 26b.

Figure 3:
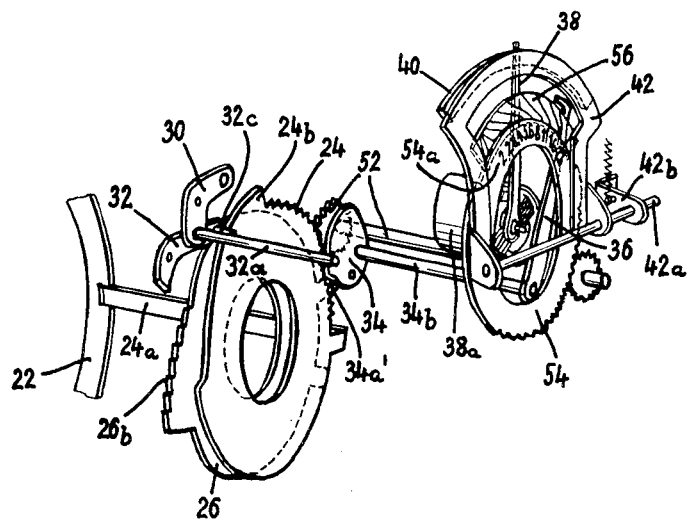
FIG. 3 is an exploded perspective view of a portion of FIG. 2 looking from the rear.

This differential rocker arrangement includes a swing arm 30 pivoted at one end on a stationary bearing pin 30a on the mount 12. A fixed spring 30b carried by the pin 30a reacting at either end against a pin on the swing arm and on the mount urges the swing arm 30 in a clockwise direction when viewed from the front as in FIG. 2. At the other end of the swing arm 30 see also FIG. 3, is supported a bearing pin 32a for pivotally mounting a rocker 32 on the swing arm. The rocker 32 is a double armed lever pivoted near its middle and urged by a spring 32b connected to the swing arm 30 in a counterclockwise direction about its bearing pin 32a, when viewed from the front as in FIG. 2. One end of the rocker 32 carries an axially extending pin 32c which is held in engagement by the spring 32b with the cam surface 24b of the control ring 24. The other end 32d of the rocker 32 provides a stop which cooperates with the steps on the cam surface 26b of the ring 26. It can be seen that the stop end 32d has a position dependent on the shutter speed setting by means of engagement of the pin 32c with the cam surface 24b.

In order to have the position of the stop 32d dependent also on an exposure value, the pin which forms the bearing 32a of the rocker 32 is extended rearwardly, parallel to the optical axis, and is held in engagement by the spring 30b with the peripheral cam surface 34a of a control disk 34 rotatably mounted in any convenient manner in fixed position on the mount 12. Upon turning the control disk 34, the bearing pin 32a is displaced corresponding to the rise of the cam surface 34a. Since this pin 32a is fixed to the swing arm 30 in a position spaced from the pivot 30a of the swing arm, displacement of the pin 32a by the action of the cam 34 will swing the arm 30 and will move the fulcrum point or pivot of the rocker 32.

The stationary support of the cam disk 34 is provided by a shaft 34b which at one end is rigidly connected by a disk with the cam disk 34 and at the other end is rigidly connected to the end of a feeler member 36. The cam disk 34 is urged in a clockwise direction by means of a spring 34c fixed at one end and bearing against a pin 34d on the disk 34 at the other end. The cam disk furthermore has on its forward face an axially extending driving pin 34e which lies in the path of a driving projection 26c on the control ring 26.

An exposure value meter of the built-in type is installed in the camera. The internal mechanism of the exposure meter may be of any suitable kind having an indicating pointer, and therefore the detailed construction of the meter is not shown. The measuring parts 38a of the meter are so arranged in the camera that its pointer 38 is swingable in a plane approximately parallel to that of the feeler member 36 and is so located that in every position it can be sensed or felt by the bent-over end 36a of the feeler member.

The pointer 38 moves freely closely adjacent a stationary movement guard 40. The pointer 38 is arranged to be held fixed in a given indicating position by being releasably clamped to the guard 40. For this purpose, a clamping bracket 42 is provided having an arcuate portion adjacent the guard 40 and movable toward and away from the guard 40 by being swingable about a stationary shaft 42a, see FIG. 3, provided at one end with a bent actuating lever 42b. One end of the actuating lever 42b, see FIG. 2, is in engagement with a bushing flange 44a mounted on a release rod 44. The end of the rod 44 is provided with a push button 44b. Normally a spring 42c acts on the bent lever 42b to hold the clamping bracket 42 in a swing away position so that the pointer 38 can move freely. In this swing away position of the bracket 42, the bushing 44a rests loosely on the bent lever 42b. A spring 44c which is stronger than the spring 42c is inserted around the rod 44 between the release button 44b and the bushing 44a. Consequently, when the push button 44b is pushed by the finger of the operator, the bushing 44a swings the lever 42b to swing the bracket 42 to a position clamping the pointer 38 against the guard 40. Thus, when the position of the pointer 38 is sensed or felt by the bent-over end 36a of the feeler member 36, the sensitive mechanism of the exposure meter is protected and the pointer 38 is not displaced by the pressure exerted against it by the feeler member 36. To hold the pointer more firmly in its instantaneous position, the pointer-contacting surfaces of one or both of the members 40 and 42 may have a thin coating of rubber, or may have shallow notches or teeth.

The cocking or tensioning of the main drive member or master member of the shutter is effected simultaneously with the film advance from the camera, as is conventional on a camera of this type. Extending out of the camera body 10 for this purpose is a cocking shaft 46 having an end extending into the objective shutter housing 14, A tensioning or cocking ring 48, frequently called the control ring of the shutter, is suitably rotatably mounted within the shutter housing and is driven by the shaft 46 through a pinion 46a which engages in the toothing 48a on the periphery of the control ring. The connections between the cocking or control ring 48 and the master member of the shutter are described in detail in the aforementioned British patent, in which the control ring 76 corresponds to the present control ring 48, and the tensioning shaft 14 of the patent corresponds to the present tensioning shaft 46. Briefly, the release of the shutter is effected by the control ring 48 by means of a cam projection 48b' thereon corresponding to the cam 120 in the British patent and which, upon the return in counterclockwise direction of the ring 48 from the cocked or tensioned position of FIG. 2 into the rest position under the actuation of a return spring 48c, releases the cocked or tensioned master member and thus effects the opening and closing of the shutter blades.

It is well to mention at this point that, as understood by those skilled in this art, shutters of the general type disclosed in the above-mentioned British patent may be conveniently divided into two different sub-types or groups, differing from each other only in the manner in which the control ring (48 in the present application, or 76 in said British patent) is held in its tensioned or cocked position until the time of making the exposure. In the first sub-type, which may be referred to as the single-shaft type, the entire operations of both tensioning the shutter and releasing it to make the exposure are controlled by a single shaft extending out the back of the shutter into the camera body. In this type, the shaft which serves to move both the control ring and the master member to their respective tensioned or cocked positions (like the shaft 46 of the present application or the shaft 14 in said British patent) is controlled by locking devices within the camera body, which prevent the shaft from turning backward (in a direction reverse to the tensioning direction) until the shutter release on the camera body is actuated. Since the single shaft cannot turn backward, the control ring likewise cannot turn backward, because the control ring is geared to the shaft. For examples of locking devices within the camera body for controlling the reverse movement of the single shaft, see U.S. Patent 2,849,938 and the above-mentioned application 520,875.

In shutters of the second sub-type, which may be referred to as the two-shaft type, the control ring is latched against return rotation, not by a latch in the camera body to prevent the reverse rotation of the tensioning shaft, but rather by a separate latch in the shutter housing, acting directly on the control ring in the shutter housing. This latch is released either by manual finger pressure on a latch part on the shutter housing (e.g., the part 94 in said British Patent 769,086) or by rotation of a second shaft, which may be called the release shaft, which is connected to the latch releasing member in the shutter housing and which extends out the back of the shutter housing into the camera body (e.g., the shaft 34 in FIG. 2 of applicant's copending application Serial No. 514,218, filed June 9, 1955, now Patent 2,900,885, granted August 25, 1959).

The present invention is illustrated, by way of example, in connection with a shutter of the two-shaft style, the shaft 46 being the cocking or tensioning shaft, and the shaft 44f being the release shaft. Thus, in the present example of the invention, the control ring 48 is held in its cocked or tensioned position by a spring loaded locking pawl 50 engaging in a recess in the ring. The locking pawl can be released by a release pawl or arm 44e, which is coupled for rotary motion toward and away from the locking pawl 50 by a linkage system 44f including a release shaft extending parallel to the optical axis out through the back of the shutter housing into the camera body, and a lever fixed to the release shaft within the camera body, the free end of the lever being arranged to be actuated by the release rod 44 upon pressing the push button 44b. A spring 45 tends to turn the release shaft in a clockwise direction when viewed from the front, and downward pressure on the release plunger 44b will turn the release shaft in a counterclockwise direction so that the arm 44e will move the locking pawl 50 to release the control ring 48 for its running down movement in a counterclockwise direction.

The control or cocking ring 48 is coupled with the ring 26 to move the diaphragm leaves to a limit position upon cocking or tensioning of the shutter. For this purpose, the ring 48 has a rearwardly extending arm 48b the end of which engages a driver arm 26a of the control ring 26, so that upon cocking of the shutter the control ring 26 is carried along against the action of a return spring 26d out of the position in which it is, in clockwise direction until it reaches, in the cocked position of the shutter, a position in which the diaphragm device is set to a limit value, for instance as shown, to fully open position. In FIG. 2, the position of the camera with the cocked position of the shutter and the limit position of the diaphragm leaves and control ring is shown.

The partially toothed control ring 24 which is coupled with the graduated rings 22 and 20b drives, through a gear and shaft arrangement 52, a graduated ring 54 suitably supported approximately concentrically with the center of oscillation of the pointer 38. On the rear of the ring 54 is provided a diaphragm scale 54a conventionally graduated in f numbers. In the rear wall of the camera body 10 there is provided a viewing window 10a which is preferably equipped with an eye piece and permits observation of a part of the pointer 38, the end 36a of the feeler member 36, and the diaphragm scale 54a. Also visible through this window is a stationary segment 56 with channel guiding lines which refer from the pointer 38 to the diaphragm values of the scale 54a. In this way the linearity in the diaphragm arrangement is adapted to the non-linearity of the exposure value meter indication. Such guiding lines for correlating the linear scale with the non-linear movements of the light meter needle or pointer are known in the art; see for example the guiding lines 49 in Fahlenberg Patent 2,849,936.

The complete shutter speed and diaphragm aperture setting chain of members are correlated in such a manner that upon the displacement of the shutter speed setting ring 20b by one value or step, the diaphragm indication 54a is also changed by one value or step in a complementary manner. That is, for a given exposure value, upon a decrease in the time of the exposure, the diaphragm opening which is indicated and is to be set is increased, or vice versa. Accordingly, the shutter speed and diaphragm aperture scales are of linear graduations, and the cam surface 24b and the other cam surface 26b are arranged in such a manner that they rise in opposite directions and are correspondingly dimensioned. Furthermore, the return range of movement of the control ring 26 to one side of the cam 26b is dimensioned with respect to the return region of the cam disk 34 and of the feeler member 36 so that the control ring 26 must pass over a short idle path before one of the steps of the cam or stop surface 26b can enter into engagement with the stop end 32d of the differential rocker 32. This short idle path is provided in order that the feeler member 36 can run down from its initial rest or limit position possibly over the entire measurement range of the exposure value meter before the stepped cam surface 26b comes in engagement with the differential rocker 32.

In the operation of the preferred embodiment of FIGS. 1 to 5, the film speed is first set on the camera by releasing the coupling leaf 22b, setting the film speed scale ring 22 relative to the shutter speed setting ring 20b, and reengaging the coupling. The shutter speed setting ring 20b is now set to the selected shutter speed. While advancing the film and simultaneously tensioning the shutter, the control ring 26 and the stop cam surface 26b, and also the diaphragm leaves 28a, are moved into their respective limit positions corresponding to maximum diaphragm aperture, this movement being produced by the tensioning clockwise rotation of the main control ring 48 and its arm 48b which acts on the diaphragm control ring 26. Upon setting the ring 20b, of course, the control ring 24 is carried along and the cam surface 24b assumes a corresponding position. Thus one end of the differential rocker 32, through the engagement of the pin 32c with the cam 24b, assumes a position dependent upon the shutter speed.

The shutter release button 44b is now actuated, thereby initially moving the release rod 44 and also the spring 44c downwardly so that the bushing 44a is depressed. The bushing 44a rotates the lever 42b and shaft 42a against the force of the spring 42c to swing the clamping bracket 42 in the direction of the guard 40 to clamp the exposure value meter pointer 38 in its instantaneous position between the two. The bushing 44a remains stationary during the further downward movement of the release rod 44, and toward the end of its movement, the lever linkage 44f is actuated to engage the pawl 44e with the tail of the locking pawl 50 to release this pawl so that the control ring 48 starts to run down out of its tensioned position. The return of the diaphragm control ring 26 from the limit position under the actuation of its spring 26d may now also start. At the start of this return movement, the driving arm 26c moves away from the pin 34e on the control disk 34, and the disk and feeler member 36 are urged in a clockwise direction under the influence of the spring 34c until the bent arm 36a engages or senses the position of the pointer 38, which has meanwhile been clamped in fixed position between the members 40 and 42. During the short idle path of the control ring 26 at the beginning of its return movement, the feeler member 36 has sensed the position of the clamped pointer 38 as already described, and therefore the control disk 34, connected to the feeler element 36, has assumed a position dependent upon light conditions as determined by the exposure meter. This controls the second point of adjustment of the rocker 32 by the engagement of the bearing pin 32a with the cam 34a. By the setting of the two points 32c and 32a of the rocker 32, its third point, the stop end 32d, is brought into the appropriate stop position necessary for determining the diaphragm aperture corresponding to the shutter speed set and the exposure value as indicated by the position of the pointer 38. That is the stop 32d is now located at a point opposite an appropriate one of the steps of the cam surface 26b corresponding to the appropriate diaphragm aperture.

Upon the further return movement of the control ring 26, its movement is stopped by the preferably self-locking engagement of the stop 32d with the alined step of the stepwise cam surface 26b. Summarizing, during the return of the diaphragm control ring 26 from the limit position of maximum diaphragm aperture, the control ring 26 is held by the differential rocker 32 in a position which gives a diaphragm aperture corresponding, for the preselected shutter speed, to the exposure value determined by the existing photographic conditions, such as the brightness of the object and the film speed of the photographic film. In many cases, the operator need not know the actual diaphragm aperture value which automatically results from this setting operation. In the case that the operator wishes to know the specific diaphragm aperture value which is set on the camera, such as when he desires a specific range of depth of field which is dependent on the diaphragm opening, the diaphragm aperture actually set may be determined by observing the position of the pointer 38 through the observation window in the rear of the camera and noting the corresponding stop or diaphragm aperture on the scale 54a. For example, with the parts in the position shown in FIG. 3, the eye of the operator can follow from the pointer 38 down the distorted lines 56 and can see that the diaphragm aperture setting is f:8.

There is another reason for making visible the actual diaphragm aperture value. An exposure value scale in general varies from 1 to about 19, while the shutter speed and diaphragm setting ranges are considerably shorter; as a rule, only about half as large. It may therefore happen that the diaphragm corresponding to a given shutter speed for a particular exposure value lies outside the diaphragm setting range. Such a limit case can be observed by glancing into the observation window in the rear of the camera, since in this case the pointer 38, having a position dependent on the exposure value, assumes a position which lies outside one end of the diaphragm scale 54a. This means that a corresponding diaphragm setting cannot be produced by the automatic mechanism.

For example, assuming that the light is weak and that the operator has selected the shortest shutter speed, 1/500 of a second, the pointer 38 could assume a position which indicates that a larger diaphragm aperture than the largest value of f:2 should be set. Of course, this larger diaphragm aperture cannot be set by the automatic mechanism. The situation may be taken care of by setting a new shutter speed having a complementary diaphragm aperture, for the particular exposure value indicated by the pointer 38, which may be set on the camera. Thus, the shutter speed setting ring may be set to a value of for instance 1/250 of a second, thereby changing the position of the differential rocker 32 such that the adjusted diaphragm aperture lies within the scale range. Generally speaking, however, in the simplest form of the invention, it is not necessary to follow up the course of the diaphragm setting. Thus the observation window together with the scale ring 54 and its diaphragm scale 54a may be eliminated.

The construction shown in the embodiment of FIGS. 1 to 5 may also be modified according to the particular operating and spatial conditions of the camera to which the invention is applied. For instance, the diaphragm control ring 26, instead of being brought directly by the cocking ring or main control ring 48 to the limit value setting, may be brought thereto by a step-up or reversal gearing if different angular ranges or directions of rotation of the different components is necessary.

It is further desirable to slow down the return movement of the cocking or main control ring 48 so that the release of the master member of the shutter, which takes place toward the end of the running down of the cocking ring, will definitely only take place after the diaphragm has been set automatically by the mechanism described. This synchronization and slowing down is also desirable in that the rocker stop end 32d strikes the cam 26b with less speed and kinetic energy, so that a lessened shock and vibration is transmitted to the pointer 38 when the diaphragm is set automatically. This slowing down may be conveniently performed by an escapement provided by a star wheel or escapement wheel 46a fixed to the cocking shaft 46, see FIG. 2, and cooperating with an anchor or vibrating pallet 46b. It can be seen that rotation of the shaft 46, and therefore of the ring 48, is slowed down by the engagement of the points of the wheel 46a with the anchor. A similar synchronization between the running down of the shutter and the diaphragm setting can also be obtained by the construction shown in FIG. 6, in which the same effect is secured by means of an intermediate escapement.

Figure 6:
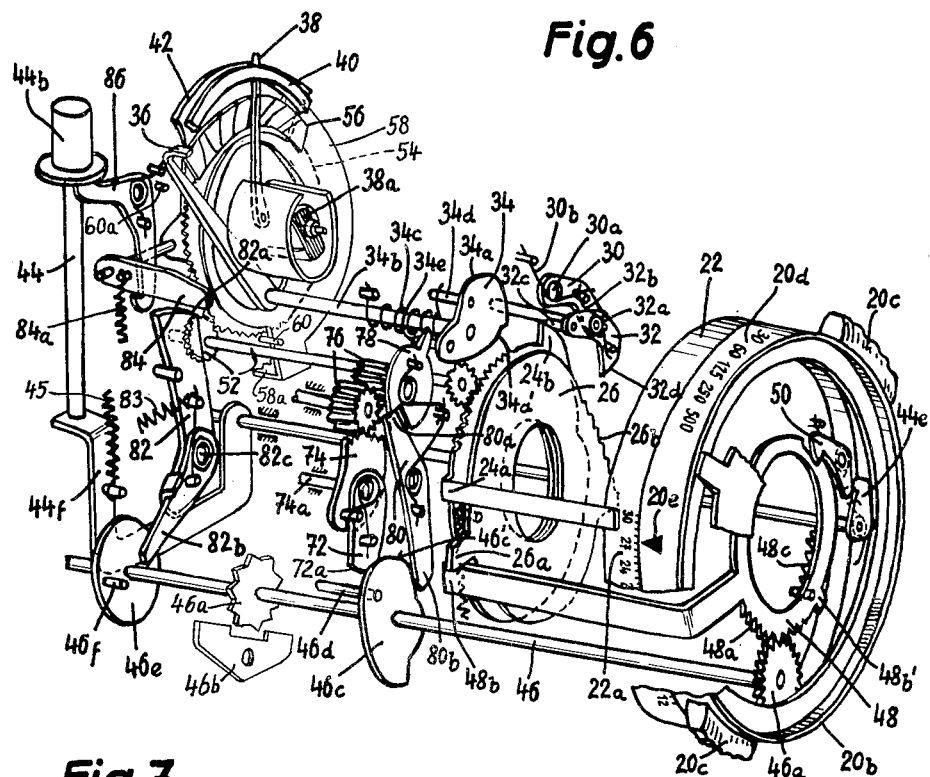
FIG. 6 is an exploded perspective view similar to FIG. 2 showing a second embodiment of the invention.

In the FIG. 6 embodiment, the control ring 26 is again carried along upon the tensioning or cocking of the shutter in the direction toward the limit position by the cocking or main control ring 48, that is, in the direction of maximum aperture, as in the case of the first embodiment. In this figure, elements which are the same as the corresponding elements in the FIG. 2 construction are given identical numerals. These same elements operate in the same manner, so that further discussion of their construction and operation is unnecessary. In this embodiment the cam disk 34 is no longer driven directly by the control ring 26 since the radial arm 26c is not present. The driving of the control disk 34 into the operating position of the feeler member 36 is effected rather by a cocking disk 46c fixed to the cocking shaft 46 and provided with a rearwardly and axially extending pin 46d. The pin 46d cooperates with a locking pawl 72 pivoted to a gear segment 74 and coupled with a gear segment for clockwise rotation by the abutment of one edge of the locking pawl with a pin on the gear segment, this abutment being normally maintained by a spring. Upon the tensioning of the shutter, the cocking disk 46c is moved in a counterclockwise direction and its pin 46d thereby drives the locking pawl 72 and turns the gear segment 74 in clockwise direction around its pivot 74a. Through a pair of interposed gears 76, a winding disk 78 is carried along a corresponding amount in the clockwise direction. The disk 78, in turn, has a projecting arm which engages a pin on the cam disk 34 and rotates the disk 34 in the counterclockwise direction, thus swinging the feeler member 36 into one extreme end limit position.

The disks 34 and 78 are held in this tensioned position by a locking lever 80. For this purpose, the winding disk 78 has a recess in its periphery for releasably receiving the arm 80a of the lever 80, the lever having another arm 80b which extends into the path of the cocking disk 46c. The disk 78 is biased in a counterclockwise direction, and the lever 80 is biased in a clockwise direction into contact with the periphery of the disk 78 by suitable springs. After the release, that is, after the cocking or main control ring 48 has been released by the locking pawl 50, the ring 48 runs down in counterclockwise direction, carrying along with it the cocking shaft 46 and the cocking disk 46c which rotate in a clockwise direction. A camlike elevated control portion 46c' on the cocking disk 46c at the start of the return movement comes into engagement with the arm 80b and releases the locking pawl 80. During this return movement, but after the pawl 80 is released, the pin 46d of the cocking disk 46c strikes the bottom 72a of the locking pawl 72 and becomes blocked thereby, as a result of which the further return of the cocking shaft 46 and of the ring 48 is for the time being prevented. With the removal of the arm 80a from the recess in the winding disk 78, the gearing parts 74, 76, and 78 begin to run down, thus withdrawing the arm on the disk 78 from the pin 34e on the cam 34, so that the spring 34c can turn the cam 34 and the shaft 34b in a clockwise direction until the feeler member 36 has reached the clamped exposure value meter pointer 38. These parts then remain held in this position by the spring 34c.

The winding disk 78, the intermediate gears 76, and the gear segment 74 run down somewhat further in the direction toward rest position, until the pawl 72 slides off of the pin 46d of the held cocking disk 46c so that the cocking disk and its shaft 46 together with the cocking or main control ring 48 may now complete their running down movement and effect the release of the shutter.

By this intermediate escapement, the assurance is obtained that the ring 48 at the end of its running down motion will effect the release of the cocked master member and the return of the diaphragm leaves from their limit position to the operating position only after the feeler 36 has returned to its operating position and the differential rocker 32 is correctly positioned. In other words, the time required for running down the gear parts 74, 76 provides a slight time lag or retardation, causing the control ring 48 to pause during the early part of its return movement, long enough to insure proper positioning of the rocker 32 before the proper step 26b of the disk 26 gets to the rocker 32.

The embodiment of FIG. 6 also illustrates another arrangement for clamping the meter pointer 38 during the release. This structure includes a control disk 46e fixed to and rotating with the cocking shaft 46, and having a forward and axially extending pin 46f. The pin 46f cooperates in a manner to be explained with a lower part 82b of a bipartite articulated setting lever 82 biased in a counterclockwise direction by a spring 83 against a suitable pin stop. The lower part 82b is pivoted to the main lever 82 at a pivot 82c and is biased in a counterclockwise direction against a stop lug carried by the main lever. A stop strap or arm 84 is rigidly connected to the shaft 42a of the clamping bracket 42 for swinging motion therewith. A bellcrank locking pawl 86 has one arm underlying the push button 44b and has a hooked end on its other arm which hooks under the arm 84 in the cocked position of the part as shown in FIG. 6, the lever 86 being biased to this position by a suitable spring. The arm 84 is held by the locking pawl 86 in this position such that the clamping bracket 42 is swung away from the guard 40 and the pointer 38 so that the pointer 38 can move freely.

When the release 44b is depressed, the locking pawl 86 pivots out from under the arm 84 and releases the arm so that the clamping bracket 42 is pressed against the pointer 38 under the action of a spring 84a, thereby clamping the pointer fast. The forward end of the arm 84 is located just above the low part of a cam-shaped upper end 82a of the lever 82, with enough clearance between the arm 84 and the cam 82a to enable the arm 84 to drop down sufficiently to cause the member 42 to clamp the pointer 38. By this arrangement, as will be more clear, the pointer 38 is not only held fast as long as the release button 44b is held depressed, as is true of the embodiment of FIGS. 1 to 5, but even after the release is let go and comes back up again under the influence of tis spring 45.

The clamping bracket 42 is swung out again and the pointer 38 released only after, during the clockwise movement of the cocking shaft 46, the pin 46f comes against the lower part 82b of the lever 82 and swings this entire lever in a clockwise direction around its pivot pin 82c. The top surface 82a of the lever 82 rises in cam-shaped fashion so that upon the swinging of the lever 82 in a clockwise direction from the rest position shown in FIG. 6, the arm 84 is raised, thus releasing the clamping bracket 42 and the pointer 38. The locking pawl 86 at this point is urged beneath the strap 84 and again ture and its operation as set forth above, so that no As already mentioned, the clamping bracket 42 in either of the embodiments may be provided with a thin rubber covering or fine notching in order to improve the clamping action. Also, the clamping bracket 40 may be made swingable as well as the bracket 42, should the specific camera structure to which the invention is applied demand this kind of action.

The operation of the modification of FIG. 6 is similar to the operation of the previously described embodiment shown in FIG. 2, taking into account the different structure and its operation as set forth above, so that no further explanation of the operation of the second embodiment is thought to be necessary.

In both embodiments, the indication of the diaphragm aperture value adjusted by the exposure value setting arrangement readable on the scale 54a according to the position of the pointer 38, is dependent, in the manner of exposure value setting mechanisms in general, on the preselected exposure time. There may be cases, however, such as when taking flashbulb pictures, when it is desired to set a particular diaphragm aperture independent of the shutter speed setting. For this case, the following arrangement, partially seen in FIG. 6 but better shown in FIGS. 7 and 8, may be employed.

Mounted rotatably and concentric to the graduated ring 54 is a stepping disk or switch disk 58 having a lever 58a which extends out of the camera housing to be accessible for manual operation by the operator. Two angularly separated fixed stops 60 and 60a lie in the path of movement of the disk segment 58 to determine two preferably notched shift positions of the disk 58. When using the automatic setting arrangement as described, the switch disk 58 is brought by the operator into the position shown in FIG. 7 abutting the stop 60, in which position it is moved out of the range of the observation window on the rear of the camera, so that the diaphragm scale 54a and the meter pointer 38 serving as a mark may be observed in the manner above described.

Figure 8:
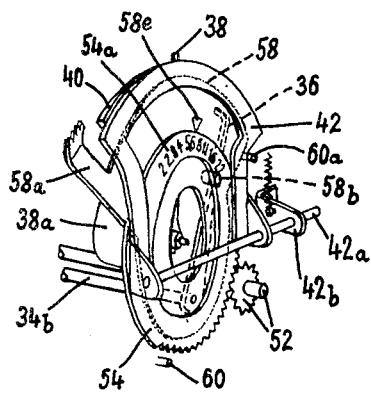

In the other position abutting the stop 60a as shown in FIG. 8, the pointer 38 and the channel lines 56 are covered by the disk 58. As the disk 58 moves against the stop 60a, a driver pin 58b on the disk 58 engages the feeler member 36 and moves the feeler member 36 to one side out of the way, at the same time rotating the cam disk 34 into a position in which it is out of the way, this position of the feeler member 36 being indicated in dotted lines in FIG. 8. Along with the motion of the cam disk 34, the pivot point of the differential rocker 32 is brought to a corresponding position by means of the cam surface 34a on the cam disk 34 and the control pin 32a. On the face of the disk 58 is a mark 58e which is now visible through the observation window of the camera. To set the diaphragm aperture independently of the shutter speed, the shutter speed setting ring 20b is preferably disconnected from the film speed scale ring 22 whereby, by adjusting the ring 22, the control ring 24 is adjusted, and with it, through the gearing connection 52, the graduated ring 54 is also adjusted. The scale 54a on the ring 54 which is adjusted as the end result of actuating the ring 22 is readable in cooperation with the mark 58e to provide a preselected diaphragm aperture value which is independent of the shutter speed setting.

Figure 7:
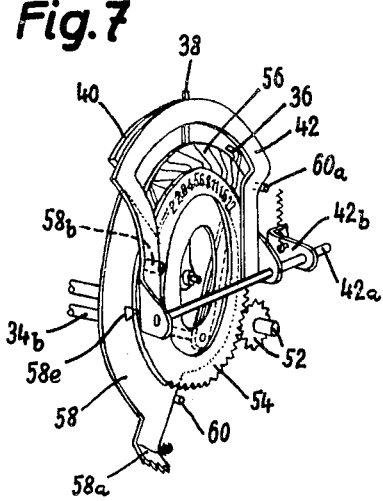
FIGS. 7 and 8 are exploded perspective views similar to a portion of FIG. 3 showing a modification thereof in two operating positions.

The independent diaphragm aperture setting arrangement of FIGS. 7 and 8 may be incorporated in either of the similar automatic setting mechanisms of FIGS. 1 to 5 or FIG. 6. The operation of this modification should be clear from what has been said previously. Upon the return of the control ring 26 from the limit position of maximum diaphragm aperture, when the push button 44b is pressed to release the main control ring 48, the feeler member 36 remains held by the pin 58b in an extreme position out of the way. The position of the differential rocker 32 is adjusted as the control ring 24 rotates with the setting ring 22, so that the control ring 26 is stopped in its running down motion by the stop 32d of the differential rocker in a position which corresponds to the diaphragm aperture value set on the scale 54a in alinement with the mark 58e.

The setting of a selected diaphragm aperture without regard to the particular shutter speed setting is useful, for instance, when taking flashlight pictures. For flashlight pictures, the shutter speed setting is not important and the diaphragm aperture is determined solely on the basis of the guide number specific to the particular flashlight apparatus used and the distance from the flashlight (usually mounted on the camera) to the principal object being photographed, according to the usual formula that the diaphragm aperture number equals the flash guide number divided by the distance. For this reason, it is desirable to characterize the operative position of the stepping disk 58 as shown in FIG. 8 by a suitable symbol, such as a lightning bolt representation, preferably provided on the arm 58a. A simplification of the setting for flash pictures may be obtained if a guide number scale is associated with the ring 22 and cooperates with a stationary auxiliary distance scale in the manner known per se.

A further development and improvement of the camera herein described is possible when the lens is mounted in a lens mount which is adjustable in the direction of the optical axis for focusing the lens for different distances. This further feature of the invention is that the diaphragm setting member is operatively coupled with the lens mount so that the axial position of the lens is dependent on the particular diaphragm aperture set, whereby the lens is automatically focused for a closer distance when setting the diaphragm to a smaller aperture. Preferably the coupling between the diaphragm aperture adjustment and the focusing adjustment is so designed that, for each aperture, the lens is focused at the hyperfocal distance determined by the size of the aperture. Thus the far end of the depth of field remains always uniform or constant (at infinity) as the size of the aperture is changed, and the near end of the depth of field is at half the hyperfocal distance for which the lens is focused. Then the operator need not bother about focusing the camera, except to make sure that the principal object in the scene is at least as far from the camera as half the hyperfocal distance.

Referring to FIG. 1, on the front side of the shutter housing 14 is fastened, in stationary position such as by screw fasteners, a supporting plate 62 in which may be mounted, as shown, one of the objective elements. The supporting plate 62 has an axially extending tubular portion forming a guide tube in which there is mounted for axial adjustment a front lens mount 64, the mount 64 being secured against rotation by means of a guide pin 62a carried by the plate 62 and engaging in an axial slot in the mount 64. The mount 64 has a flange 64a against which press rearwardly a plurality of springs 66 suitably circumferentially distributed, these springs resting at their other or forward ends against a flange on a front cover cap 68. Mounted on the plate 62 rearwardly of and spaced from the flange 64a is a focus setting ring 70. On the side of the flange 64a facing the ring 70, there are provided a plurality of circumferentially spaced mushroom control pins 64b each of which cooperates with a cam surface 70a located on the front side of the setting ring 70. The cam surfaces 70a rise axially in cam-like manner.

The setting ring 70 has a radial fork-shaped arm 70b in which is engaged a forwardly extending arm 26e of the diaphragm control ring 26. By rotating the control ring 26 in a direction to decrease the diaphragm aperture, the setting ring 70 is also moved in the same direction and the mount 64 is moved forwardly by the cam surfaces 70a acting on the control pin 64b in opposition to the inward force of the springs 66. Since the setting ring 70 is positively coupled with the control ring 26 and thus with the diaphragm setting mechanism, it results that the axial displacement of the front lens as required for obtaining the correct distance focusing is obtained for the particular diaphragm aperture set. The cam surfaces 70a are so dimensioned that upon the setting of the control ring 26 and the diaphragm aperture mechanism to one limit position of full diaphragm opening, the lens is automatically adjusted in the direction of the infinity focusing position, and upon return of the ring 26 from the full opening diaphragm position to a smaller diaphragm aperture, the lens is automatically adjusted in the direction for giving a focus for nearer distances.

The operation of this feature of the invention should be clear from the foregoing. By this positive coupling between the diaphragm and distance settings, the lens is automatically adjusted to the axial position corresponding to the instantaneous diaphragm aperture value and thus to the maximum possible depth of field proceeding from infinity. Accordingly, in addition to the diaphragm scale 54a or in replacement of it, a corresponding hyperfocal distance scale may be provided on the scale ring 54, if desired.

The automatic exposure value setting arrangement in accordance with the invention utilizing the differential rocker has the advantage that the differential rocker may be easily located in such position that the highly sensitive parts of the exposure value meter including the pointer 38 are treated gently when the control ring 26 is stopped at the appropriate diaphragm aperture. More specifically, the differential rocker may be located with respect to the control ring 26 in such a manner that as the ring 26 runs down from the limit position of maximum aperture, the forces produced upon the impact of the returning control ring 26 against the differential rocker can be intercepted by the bearing lever 30 and by the control ring 24 in their entirety, so that upon the stopping of the control ring 26, no unfavorable reactionary force is transmitted to the kinematic chain which extends from the differential rocker 32 to the feeler member 36. As a result of this, the sensitive meter pointer 38 and pointer operating mechanism 38a are treated gently. Furthermore the mechanism may be set with greater accuracy since the pointer 38 retains its precise clamped position. Furthermore, the members of the feeling mechanism, primarily the control disk 34 as well as the feeler member 36, can be given very small dimensions and can accordingly be equipped with only a very slight restoring spring force 34c. By comparison, the control rings 24 and 26 may be made large and provided with a broad support, and be acted upon by strong return springs.

Another advantage of the invention is that portions of the elements of the automatic exposure value setting system, such as the parts for bringing the diaphragm control ring 26 into the limit position of maximum aperture and for bringing the other parts to their respective tensioned or limit positions, and for releasing the return movement and if necessary, also for adapting the return movement to the run-down movement of the shutter or of its cocking mechanism, can be operatively connected with other portions of the camera. For instance, it is possible to couple the cocking or tensioning movement of the shutter and of the automatic setting mechanism with the film transport, and also to connect the release movement of the automatic setting system with the release movement of the shutter. Thus it is possible to design a camera utilizing the present invention which may be operated with a minimum expenditure of mental labor and adjustment work. The operator, in the simplest case, to take a picture need only select in advance the desired shutter speed, then cock the camera and press the release. The other processes are all automatically effected. The arrangement desirably is such that the camera may, if desired, be set for any particular factor such as diaphragm aperture, individually, without the automation previously referred to. There results a camera which is suitable for a beginner while yet permitting the expert to effect the settings necessary for a photograph with greater freedom.

It is seen from the foregoing disclosure that the above mentioned objects of the invention are well fulfilled. It is to be understood that the foregoing disclosure is given by way of illustrative example only, rather than by way of limitation, and that without departing from the invention, the details may be varied within the scope of the appended claims.

For example, the invention may be utilized with cameras of other types than that herein described. For instance, the limit position of the control ring 26 may be associated not with the maximum opening but rather with the minimum opening of the diaphragm mechanism. Furthermore, it is possible to have an arrangement in which it is not the diaphragm which is regulated in the manner described, but rather, in a similar manner, the shutter speed. It is also possible to develop the differential rocker as a single-armed lever rather than as a double-armed lever. The individual operating points of this single-armed rocker may be controlled in analogous manner in relation to the diaphragm aperture setting and on the basis of the exposure meter indication. It is also possible to use the invention with an exposure meter having two measurement ranges, for which purpose two correspondingly dimensioned switchable cam disks 34 may be used and connected with the switch or flap of the exposure meter for changing measurement ranges in such a manner that upon shifting the exposure meter measurement range, the corresponding cam disk 34 comes into active connection with the control pin 32a of the differential rocker 32. Finally, it may be mentioned that the observation window for observing the pointer of the exposure value meter need not be arranged on the rear of the camera alongside the finder window, but may be arranged, in accordance with the available space, at another point in the camera or in another position.

What is claimed is:

1. A photographic camera comprising a camera body including an exposure meter having a pointer, an objective unit attached to said camera body, a shutter speed control member and a diaphragm aperture control member rotatably mounted on said objective unit, means providing oppositely radially rising cams operatively connected to said control members to turn therewith, one of said control members being freely movable to a preselected position, means for moving the other of said control members to a limit position, means for biasing said other control member for return movement from said limit position, and a stop member for stopping said return movement, said stop member comprising a differential rocker having two adjustable points and a stop end to be adjusted by the location of said two points for abutment with an appropriate portion of the radially rising cam on said other control member, the first of said two points being in engagement with the radially rising cam on said one control member, and means releasably coupling the second of said two points with said meter pointer for assuming a position dependent on the light value indicated by said meter.

2. A construction as defined in claim 1, wherein said differential rocker is a double-armed lever having said second point as the pivot point thereof, said means releasably coupling said second point with said meter pointer including a feeler member engageable with said pointer and further including means for moving said feeler member to a limit position and for running down from said limit position into releasable engagement with said meter pointer.

3. A construction as defined in claim 1, wherein said means releasably coupling the second of said two points with said meter pointer includes a rotatable feeler member engageable with said pointer, a cam disk having a peripheral cam surface coupled for rotary motion with said feeler member, a control pin coupled to said second rocker point and urged against said peripheral cam surface, and means for moving said feeler member to a limit position and for running down from said limit position including a driver connected to said other control member and engageable with said cam disk simultaneously with the movement to limit position and running down of said other control member, and spring means for returning said feeler member from said limit position.

4. A construction as defined in claim 3, wherein said other control member is the diaphragm aperture control member, and further including a shutter cocking ring operatively connected thereto, said cocking ring being adapted to be coupled with a film advance and winding mechanism so that upon cocking the shutter said diaphragm control member and feeler member are moved into said limit positions thereof.

5. A photographic camera comprising a camera body including an exposure meter having a pointer, an objective unit attached to said camera body, a shutter speed control member and a diaphragm aperture control member rotatably mounted on said objective unit, means providing oppositely radially rising cams operatively connected to said control members to turn therewith, one of said control members being freely movable to a preselected position, means for moving the other of said control members to a limit position, means for biasing said other control member for return movement from said limit position, and a stop member for stopping said return movement, said stop member comprising a differential rocker having two adjustable points and a stop end to be adjusted by the location of said two points for abutment with an appropriate portion of the radially rising cam on said other control member, the first of said two points being in engagement with the radially rising cam on said one control member, and means releasably coupling the second of said two points with said meter pointer for assuming a position dependent on the light value indicated by said meter, said releasable coupling means including a rotatable feeler member engageable with said meter pointer and mounted for movement to a limit position and for return movement from said limit position, means for operatively connecting said other control member with said feeler member, a cocking ring coupled with said other control member for simultaneously moving said feeler member and other control member to said limit positions thereof, and locking means for holding said cocking ring in a cocked position and for simultaneously holding said feeler member and other control member in said limit positions thereof.

6. A construction as defined in claim 5, further including a shutter release, and means operatively connecting said shutter release and locking means for unlocking said locking means in response to release movement of said shutter release.

7. A construction as defined in claim 6, including clamp means movable between an inoperative position and an operative position clamping said meter pointer in its indicating position, and means coupling said shutter release and clamp means for movement of said clamp means to said operative position in response to release movement of said shutter release.

8. A photographic camera comprising a camera body including an exposure meter having a pointer, an objective unit attached to said camera body, a shutter speed control member and a diaphragm aperture control member rotatably mounted on said objective unit, means providing oppositely radially rising cams operatively connected to said control members to turn therewith, one of said control members being freely movable to a preselected position, means for moving the other of said control members to a limit position, means for biasing said other control member for return movement from said limit position, and a stop member for stopping said return movement, said stop member comprising a differential rocker having two adjustable points and a stop end to be adjusted by the location of said two points for abutment with an appropriate portion of the radially rising cam on said other control member, the first of said two points being in engagement with the radially rising cam on said one control member, and means releasably coupling the second of said two points with said meter pointer for assuming a position dependent on the light value indicated by said meter, and escapement means coupled with said other control member for slowing down said return movement from said limit position.

9. A photographic camera comprising a camera body including an exposure meter having a pointer, an objective unit attached to said camera body, a shutter speed control member and a diaphragm aperture control member rotatably mounted on said objective unit, means providing oppositely radially rising cams operatively connected to said control members to turn therewith, one of said control members being freely movable to a preselected position, means for moving the other of said control members to a limit position, means for biasing said other control member for return movement from said limit position, and a stop member for stopping said return movement, said stop member comprising a differential rocker having two adjustable points and a stop end to be adjusted by the location of said two points for abutment with an appropriate portion of the radially rising cam on said other control member, the first of said two points being in engagement with the radially rising cam on said one control member, and means releasably coupling the second of said two points with said meter pointer for assuming a position dependent on the light value indicated by said meter, said releasable coupling means including a rotatable feeler member engageable with said meter pointer and mounted for movement to a limit position and for return movement from said limit position, means for operatively connecting said other control member with said feeler member, a cocking ring coupled with said other control member for simultaneously moving said feeler member and other control member to said limit positions thereof, said cocking ring being adapted to operate the opening and closing of a plurality of shutter blades upon the running down thereof, and intermediate escapement means for slowing the running down of said cocking ring so that said differential rocker comes into abutment with the radially rising cam on said other control member before the opening and closing of the shutter blades.

10. A photographic camera comprising a camera body including an exposure meter having a pointer, an objective unit attached to said camera body, a shutter speed control member and a diaphragm aperture control member rotatably mounted on said objective unit, means providing oppositely radially rising cams operatively connected to said control members to turn therewith, one of said control members being freely movable to a preselected position, means for moving the other of said control members to a limit position, means for biasing said other control member for return movement from said limit position, and a stop member for stopping said return movement, said stop member comprising a differential rocker having two adjustable points and a stop end to be adjusted by the location of said two points for abutment with an appropriate portion of the radially rising cam on said other control member, the first of said two points being in engagement with the radially rising cam on said one control member, and means releasably coupling the second of said two points with said meter pointer for assuming a position dependent on the light value indicated by said meter, said releasable coupling means including a rotatable feeler member engageable with said meter pointer and mounted for movement to a limit position and for return movement from said limit position, means for operatively connecting said other control member with said feeler member, a cocking ring coupled with said other control member for simultaneously moving said feeler member and other control member to said limit positions thereof, said cocking ring being adapted to operate the opening and closing of a plurality of shutter blades upon the running down thereof, a cocking shaft coupled with said cocking ring, and intermediate escapement means operatively connected with said cocking shaft for slowing the running down of said cocking ring so that said differential rocker comes into abutment with the radially rising cam on said other control member before the opening and closing of the shutter blades.

11. A photographic camera comprising a camera body including an exposure meter having a pointer, an objective unit attached to said camera body, a shutter speed control member and a diaphragm aperture control member rotatably mounted on said objective unit, means providing oppositely radially rising cams operatively connected to said control members to turn therewith, one of said control members being freely movable to a preselected position, means for moving the other of said control members to a limit position, means for biasing said other control member for return movement from said limit position, and a stop member for stopping said return movement, said stop member comprising a differential rocker having two adjustable points and a stop end to be adjusted by the location of said two points for abutment with an appropriate portion of the radially rising cam on said other control member, the first of said two points being in engagement with the radially rising cam on said one control member, and means releasably coupling the second of said two points with said meter pointer for assuming a position dependent on the light value indicated by said meter, said means releasably coupling said second point with said meter pointer including a feeler member engageable with said pointer and further including means for moving said feeler member to a limit position and for running down from said limit position into releasable engagement with said meter pointer, said one control member being the shutter speed control member and the other control member being the diaphragm aperture control member, and a disk mounted rotatably and coupled with said shutter speed control member for adjustment therewith, said disk carrying a diaphragm aperture scale and being located so as to be readable using said meter pointer as a mark.

12. A construction as defined in claim 11, including a switch disk manually movable from an inoperative position to an operative position covering the end of said meter pointer, a reading mark carried by said switch disk for cooperation with said diaphragm scale, and a driver carried by said switch disk for moving said feeler member to an out of the way position simultaneously with the movement of said switch disk to said operative position.

13. A photographic camera comprising a camera body including an exposure meter having a pointer, a shutter unit attached to said camera body and having an optical axis, said unit including a lens adjustable in the direction of the optical axis for distance focusing, a shutter speed control member and a diaphragm aperture control member mounted rotatably on said unit, said shutter speed control member being freely movable to a preselected position, means for moving said diaphragm control member to a limit position, means for biasing said diaphragm control member for return movement from said limit position, means including a stop member for stopping said return movement at a position dependent on the preselected position of said shutter speed control member and on the position of said meter pointer, and means for coupling said diaphragm control member and said lens for axially shifting said lens to a position for focusing said lens for the hyperfocal distance determined by the position of said diaphragm control member.

References Cited in the file of this patent

UNITED STATES PATENTS

| | | |
|---|---|---|
| 2,148,963 | Rauch | Feb. 28, 1939 |
| 2,315,977 | Mihalyi | Apr. 6, 1943 |
| 2,342,819 | Priesemann | Feb. 29, 1944 |
| 2,350,009 | Babcock | May 30, 1944 |
| 2,780,971 | Fahlenberg | Feb. 12, 1957 |
| 2,901,957 | Fahlenberg | Sept. 1, 1959 |
| 2,923,216 | Greger | Feb. 2, 1960 |
| 2,925,760 | Broschke | Feb. 23, 1960 |
| 2,990,758 | Sauer | July 4, 1961 |